US007397565B2

(12) United States Patent
Nakaya et al.

(10) Patent No.: US 7,397,565 B2
(45) Date of Patent: Jul. 8, 2008

(54) DEVICE AND METHOD FOR OBTAINING APPEARANCE INFORMATION

(75) Inventors: Fumio Nakaya, Kanagawa (JP); Hirokazu Ichikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 330 days.

(21) Appl. No.: 11/374,006

(22) Filed: Mar. 14, 2006

(65) Prior Publication Data

US 2006/0210295 A1 Sep. 21, 2006

(30) Foreign Application Priority Data

Mar. 15, 2005 (JP) ............................ 2005-073613

(51) Int. Cl.
*G01N 21/47* (2006.01)
*G01B 11/30* (2006.01)

(52) U.S. Cl. ........................ 356/446; 356/448; 356/600

(58) Field of Classification Search ......... 356/445-448, 356/600, 237.1-237.5; 382/294
See application file for complete search history.

(56) References Cited

U.S. PATENT DOCUMENTS

| | | | | |
|---|---|---|---|---|
| 5,963,328 | A * | 10/1999 | Yoshida et al. | 356/600 |
| 6,018,396 | A * | 1/2000 | Rapaport et al. | 356/446 |
| 6,590,223 | B1 * | 7/2003 | Chelvayohan | 250/559.4 |
| 6,713,775 | B2 * | 3/2004 | Chelvayohan et al. | 250/559.16 |
| 6,914,684 | B1 * | 7/2005 | Bolash et al. | 356/600 |
| 6,998,628 | B2 * | 2/2006 | Chelvayohan | 250/559.01 |
| 7,315,379 | B2 * | 1/2008 | Jinno | 356/445 |
| 2006/0215933 | A1 * | 9/2006 | Nakaya et al. | 382/294 |
| 2006/0256341 | A1 * | 11/2006 | Kuwada | 356/445 |
| 2007/0091465 | A1 * | 4/2007 | Ichikawa et al. | 359/726 |
| 2007/0177233 | A1 * | 8/2007 | Ichikawa et al. | 358/509 |
| 2008/0056752 | A1 * | 3/2008 | Denton et al. | 399/74 |

FOREIGN PATENT DOCUMENTS

| | | |
|---|---|---|
| JP | A-05-313537 | 11/1993 |
| JP | A-05-333643 | 12/1993 |
| JP | A-06-70097 | 3/1994 |

* cited by examiner

*Primary Examiner*—Hoa Q Pham
(74) *Attorney, Agent, or Firm*—Morgan, Lewis & Bockius LLP

(57) ABSTRACT

A device has first and second units that lights an object at first or second incident angles; a unit that generates image signals according to the intensity of the received light; units that guides diffusely and specularly reflected light from the object to the image-input unit; units that generates glossiness information, and texture information for the object, and image data based on image signals generated; a unit that generates and outputs the image data from glossiness information, texture information, and image data.

11 Claims, 9 Drawing Sheets

FIG. 5
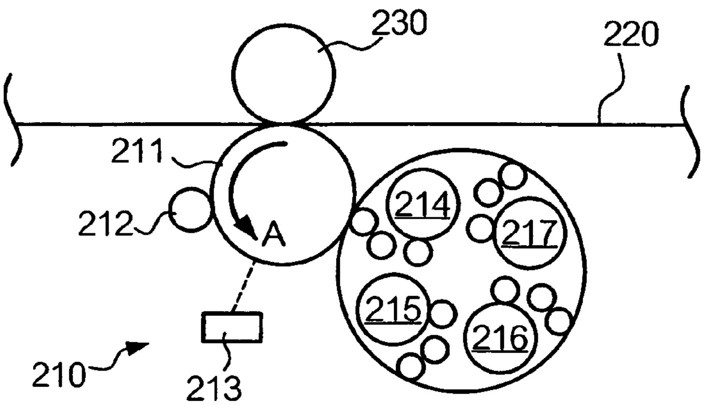
FIG. 6
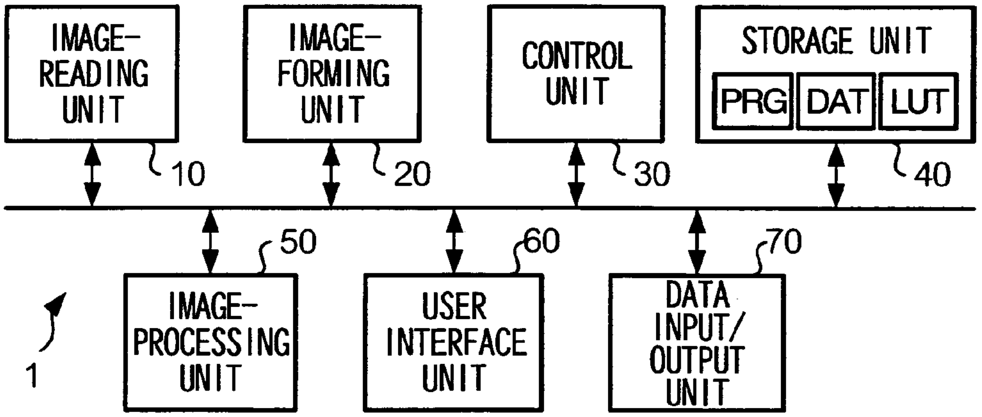
FIG. 7
| | (45/0) | (65/0) | (45/45) | GLOSSINESS LEVEL |
|---|---|---|---|---|
| METAL A | 3 | 3 | 90 | 10 |
| METAL B | 10 | 9 | 78 | 8 |
| METAL C | 1 | 1 | 92 | 10 |
| FABRIC D | * * | * * | * * | 5 |
| FABRIC E | * * | * * | * * | 4 |
| PAPER F | * * | * * | * * | 6 |
| ⋮ | ⋮ | ⋮ | ⋮ | ⋮ |

FIG. 15

| COLOR | PEAK WAVELENGTH |
|---|---|
| Blue1 | 420~430nm |
| Blue | 450nm |
| Blue2 | 470nm |
| Blue-Green | 490nm |
| Green1 | 510nm |
| Green | 520~530nm |
| Green2 | 550nm |
| Yellow-Green | 570nm |
| Orange | 590nm |
| Red1 | 610nm |
| Red | 630nm |
| Red2 | 650nm |

DEVICE AND METHOD FOR OBTAINING APPEARANCE INFORMATION

The entire disclosure of Japanese Patent Application No. 2005-73613 filed on Mar. 15, 2005 including specification, claims, drawings and abstract is incorporated herein by reference in its entirety.

BACKGROUND

1. Technical Field

The present invention relates to obtaining information on appearance of an object.

2. Related Art

Objects have many different appearances. For example, a surface of polished metal has a smooth and glossy appearance, whereas a surface of fabric has a unique uneven appearance caused by a textured structure generated by warp and woof of the fabric.

There are techniques of generating glossiness information using an image-reading device such as a scanner or an input unit of a photocopier.

However the appearance of an object depends not only on its glossiness, but also on its texture caused by its unevenness, as explained above. Thus, information on glossiness of an object is not sufficient to enable realistic reproduction of an image of the object.

The present invention has been made in view of the above circumstances, and provides device and method for obtaining appearance information.

SUMMARY

According to an aspect of the present invention, a device is provided including a first lighting unit that lights an object at a first incident angle; a second lighting unit that lights the object at a second incident angle; an image-input unit that receives light and generating image signals according to the intensity of the received light; a first guiding unit that guides diffusely reflected light from the object to the image-input unit, allows the image-input unit to generate first image signals for the diffusely reflected light from the object lit by the first light source, and allows the image-input unit to generate second image signals for the diffusely reflected light from the object lit by the second light source; a second guiding unit that guides specularly reflected light from the object to the image-input unit, allows the image-input unit to generate third image signals for the specularly reflected light from the object to the image-input unit, allows the image-input unit to generate third image signals for the specularly reflected light from the object; a unit that generates glossiness information expressing the glossy regions on the object based on the first and the third image signals generated by the image-input unit; a unit that generates texture information expressing the textured region on the object based on the first and the second image signals generated by the image-input unit; a unit that generates image data based on at least one of the first signals or the second signals; and includes the generated glossiness information and the generated texture information in the image data.

BRIEF DESCRIPTION OF THE DRAWINGS

Embodiments of the present invention will be described in detail based on the figures, wherein:

FIG. 5 illustrates a construction of a development unit in the image-forming device according to the same embodiment;

FIG. 6 illustrates a functional diagram of the image-forming device;

FIG. 7 illustrates examples of data stored in look-up table LUT;

FIG. 15 illustrates color examples used for estimation of spectral reflectivity.

DETAILED DESCRIPTION

A. Construction

A-1. Image-Forming Device

Figure 1:
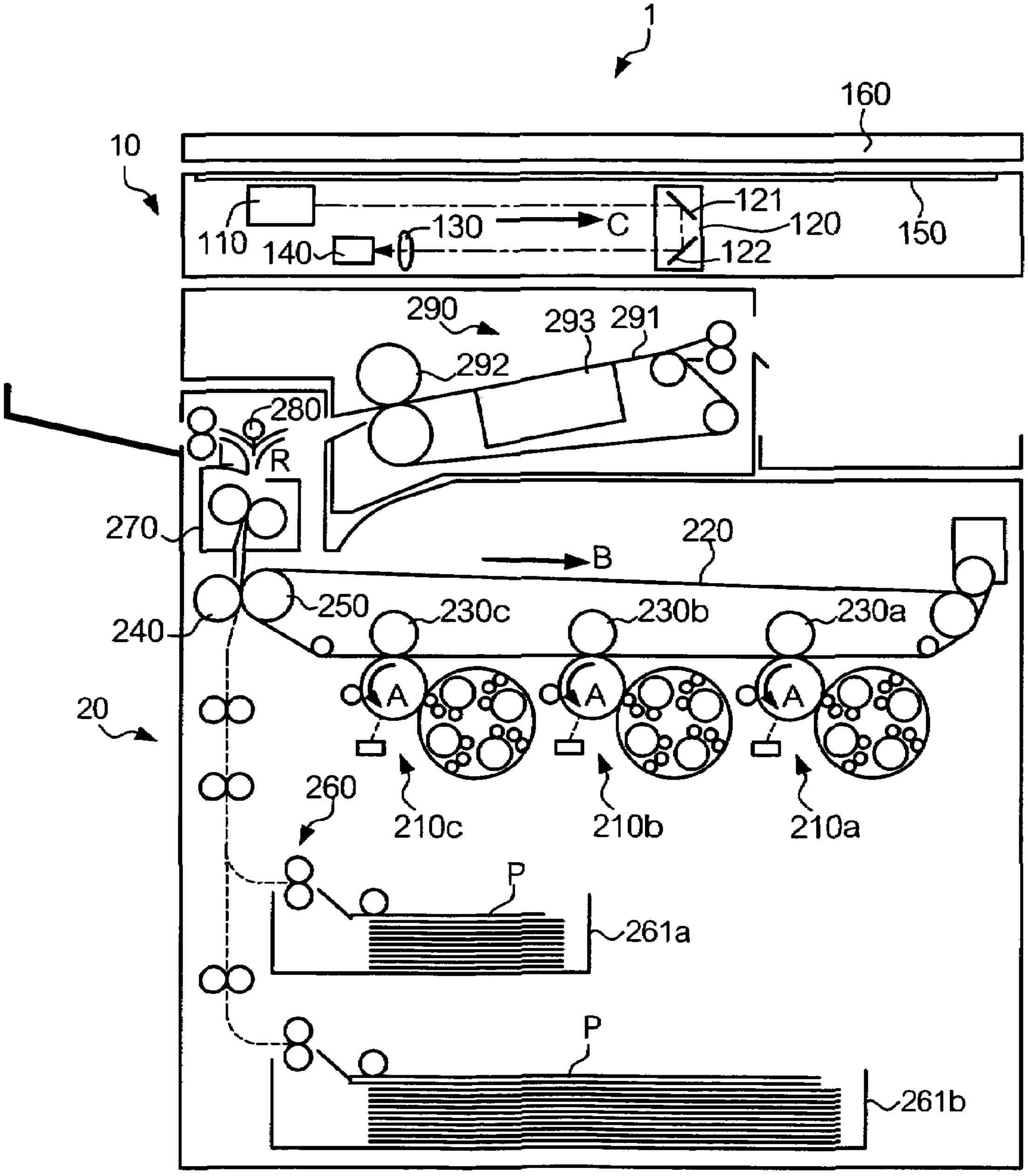
FIG. 1 illustrates a construction of an image-forming device according to an embodiment of the present invention.

FIG. 1 illustrates a construction of image-forming device 1 according to an embodiment of the present invention. The main part of image-forming device 1 consists of an image-reading unit 10 and an image-forming unit 20. Namely, image-forming device 1 is constructed as a multi-function device having both scanning and printing functions.

Image-reading unit 10 generates image data from an object made of various materials such as paper, fabric, or metal. Image-forming unit 20 forms a toner image on a recording medium such as a recording paper based on the read image data. In an example case, image-reading unit 10 generates image data from an object by scanning the object; and image-forming unit 20 prints an image corresponding to the generated image data on a paper.

A-2. Reflection of Light

Figure 2:
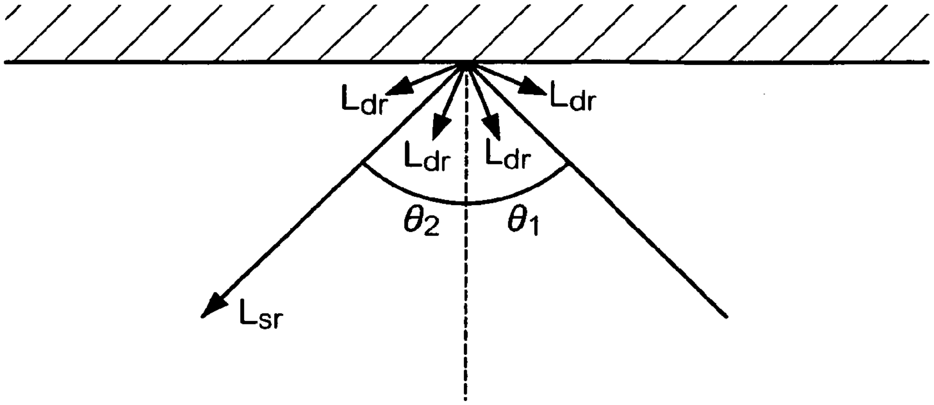
FIG. 2 illustrates the nature of reflection of light from an object.

FIG. 2 illustrates the nature of reflection of light from an object. It is generally understood that when light is impinged on a surface of an object at an incident angle □1 and reflected from the object at a reflection angle □2, the reflection angle □2 is equal to the incident angle □1 (Law of Reflection). However, in reality, light is not only reflected from the surface of an object at the reflection angle □$_2$ but is also reflected at other angles.

This is because a reflection plane (a surface of an object) is not always flat, and has a degree of unevenness. When a reflection plane has such unevenness, the light is reflected at various angles due to the unevenness.

In the present invention, "specular reflection" means a reflection of light from a macroscopic reflection plane with a reflection angle which is substantially equal to an incident angle, and "specularly reflected light" means light thus reflected; and "diffuse reflection" means all reflections of light from the macroscopic reflection plane other than the specular reflection, and "diffusely reflected light" means light thus reflected.

In the attached drawings, a symbol Lsr is added to a light path indicating specularly reflected light; and a symbol Ldr is added to a light path indicating diffusely reflected light, where it is necessary to distinguish them.

It is to be noted that, in general, an object is glossier when an amount of specularly reflected light reflected from the object increases relative to diffusely reflected light. Glossiness of an object depends on a microscopic structure of the surface of an object. Namely an object is glossier when the surface of the object becomes microscopically flat.

Also in reality, specularly reflected light is not reflected from an object at a single ideal reflection angle. On the contrary, specularly reflected light is broadened by a range of angles around the ideal reflection angle. The intensity distribution of specularly reflected light varies depending on a macroscopic nature of the surface of an object, such as material or texture of the object.

A-3. Image-Reading Unit

As shown in FIG. 1, image-reading unit 10 has a full-rate carriage unit 110, a half-rate carriage unit 120, a focusing lens 130, an inline sensor 140, a platen glass 150, and a platen cover 160.

Figure 3:
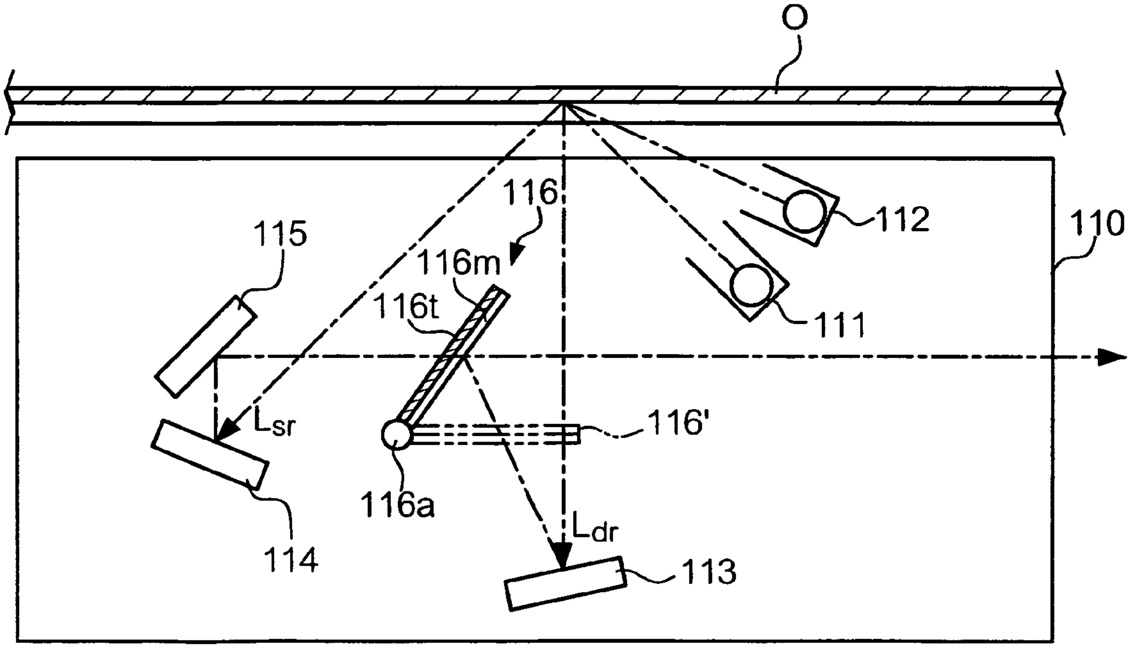
FIG. 3 illustrates details of a full-rate carriage unit in the image-forming device according to the same embodiment.

FIG. 3 illustrates details of full-rate carriage unit 110. Full-rate carriage unit 110 has a first light source 111, a second light source 112, mirrors 113, 114, 115, and a rotatable reflector 116.

First light source 111 and second light source 112 emit light whose spectral energy distribution covers the whole range of visible light. They are configured as Tungsten halogen lamps, Xenon arc lamps or the like.

First light source 111 lights object O at an incident angle of about 45°, whereas second light source 112 lights object O at an incident angle of about 65°.

Mirrors 113, 114, 115 reflect the light reflected from object O, so as to guide the light to half-rate carriage unit 120. Mirror 113 is positioned so that the light reflected from object O at a reflection angle of about 0° impinges on mirror 113. Mirror 114 is positioned so that the light reflected from object O at a reflection angle of about 45° impinges on mirror 114.

More precisely, the light reflected from object O at a reflection angle of −5° to 5° impinges on mirror 113. In this case, the light contains only diffusely reflected light and no specularly reflected light. Accordingly, the diffusely reflected light is obtainable from light Ldr reflected from mirror 113.

The light reflected from object O at a reflection angle of 40° to 50° impinges on mirror 114. In this case, most of the reflected light is specularly reflected light. Accordingly, the specularly reflected light is obtainable from light Lsr reflected from mirror 114.

It is to be noted that the ideal position of mirror 114 varies depending on the materials of object O. When most of the surface of object O has low glossiness, it is preferable for mirror 114 to be positioned so that the light reflected from object O at a reflection angle of exactly 45° impinges on mirror 114. When most of the surface of object O has high glossiness levels, it is preferable for mirror 114 to be positioned so that the light reflected from object O at a reflection angle slightly offset from 45° impinges on mirror 114. This is because the intensity distribution of reflected light varies according to the glossiness, although the glossiness is determined by reflected light.

Figure 4A:
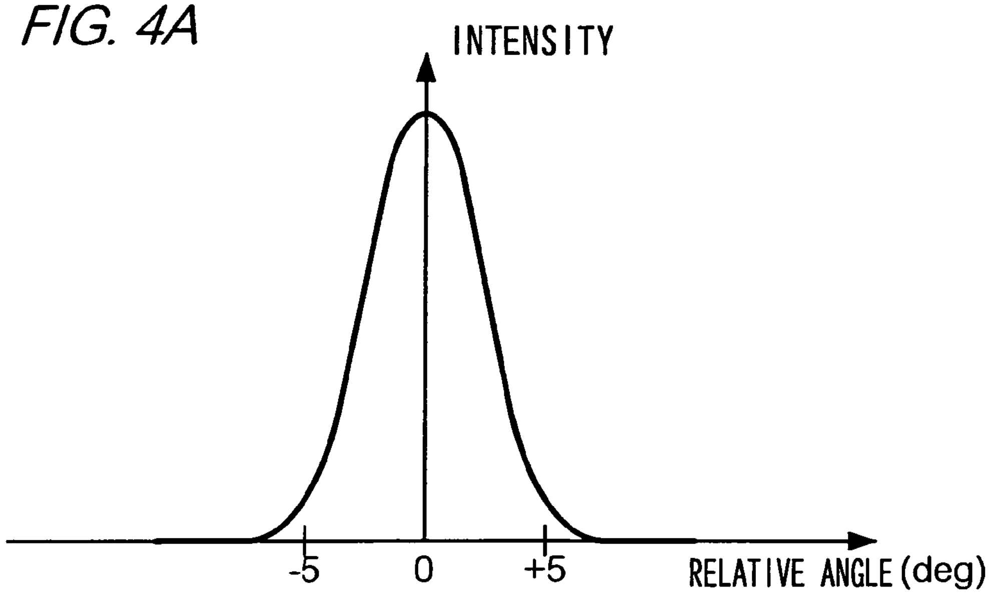
FIGS. 4A to 4C illustrate three typical types of intensity distributions of light reflected from an object.
Figure 4B:
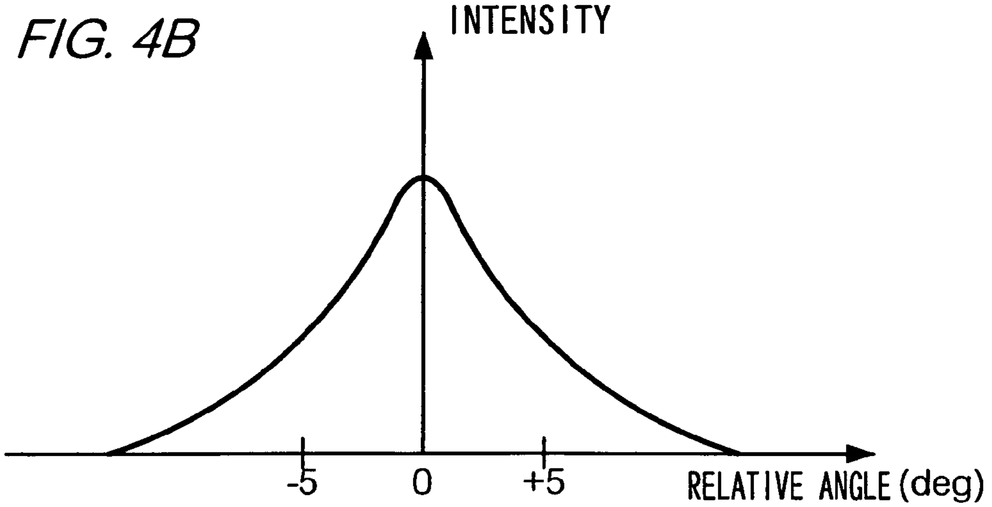
Figure 4C:
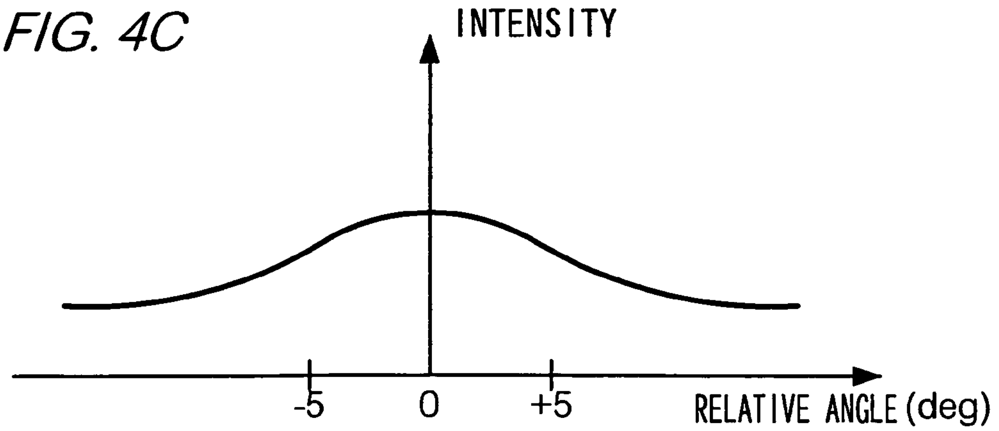

FIGS. 4A to 4C illustrate three typical types of intensity distributions of light reflected from an object. In the figures, each horizontal axis denotes an offset angle, which corresponds to the difference between a reflection angle and an incident angle in reflection; and each vertical axis denotes intensity of light.

FIG. 4A illustrates an intensity distribution of light reflected from a highly glossy object, such as polished metal. FIG. 4B illustrates an intensity distribution of light reflected from a medium glossy object, such as smooth glossy fabric. FIG. 4C illustrates an intensity distribution of light reflected from an object with very low glossiness, such as Japanese "washi" paper.

As shown in FIG. 4A, an intensity distribution of light reflected from a highly glossy object has, in general, a steep peak. Namely, light is rarely reflected at angles other than the specular reflection angle.

As shown in FIG. 4C, an intensity distribution of light reflected from an object with a low glossiness level has a broader peak. Namely, some portion of light is reflected at angles other than the specular reflection angle.

It is to be noted that an intensity of specularly reflected light from an object may exceed a dynamic range of inline sensor 140, such as a CCD (Charge Coupled Device) image sensor, since the intensity of the specularly reflected light from a highly glossy object may become very high, as shown in FIG. 4A. In such a case, the output of the inline sensor 140 is saturated, so that an intensity of reflected light cannot be measured properly.

Accordingly, in a case of obtaining appearance information from a highly glossy object, mirror 114 is positioned so that the light reflected from an object at a reflection angle of 45° does not impinge on mirror 114.

In a case that an object is very glossy and that the reflected light from the object has an intensity distribution shown in FIG. 4A, it is preferable that light reflected from an object at reflection angles of about 43° to 44° or 46° to 47° impinges on mirror 114. This is because the specularly reflected light hardly impinges on mirror 114 when the reflection angles are offset by more than 1° to 2° from 45°.

In another case, where the reflected light from an object has an intensity distribution shown in FIG. 4B, it is preferable that the light reflected from an object at a reflection angle of about 42° or 48° impinges on mirror 114.

In a case between the above two cases, it is preferable that the light reflected from an object with an appropriate reflection angle of about 42° to 43° or 47° to 48° impinges on mirror 114, so that the technique is applicable in general use for various objects Alternatively, it is preferable to use inline sensor 140 containing image-input elements with wider dynamic range, or to shorten a time of exposing inline sensor 140 to light.

In the following, the reflection angle is assumed to be 45°, to keep the description concise.

Rotatable reflector 116 has a mirror 116*m* on one side for reflecting light, and a light trap 116*t* on another side for absorbing light. Light trap 116*t* is configured as, for example, a black porous polyurethane sheet, where most of the incident light is trapped and absorbed on its surface.

When rotatable reflector 116 is positioned at the position shown by lines in FIG. 3, mirror 116*m* of rotatable reflector 116 reflects light from mirror 113 in the direction of half-rate carriage unit 120, whereas light trap 116*t* of rotatable reflector 116 adsorbs light reflected from mirror 115.

Rotatable reflector 116 is movable to position 116' drawn with dotted lines in FIG. 3 by a rotation around axis 116*a* driven by a driving unit (not shown). At position 116', light from mirror 114 is guided via mirror 115 to half-rate carriage unit 120, while light Ldr in the direction to mirror 113 is adsorbed by light trap 116*t*.

In both positions of rotatable reflector 116, light is reflected from either mirror 115 or mirror 116*m* of rotatable reflector 116, toward image-input unit (inline sensor 140).

As shown in FIG. 1, full-rate carriage unit 110 obtains appearance information from object O, while being driven in the direction of arrow C with a velocity v by a driving unit (not shown). In the following, these are referred as "scanning operations".

Half-rate carriage unit 120 has mirrors 121 and 122, and guides light from full-rate carriage unit 110 to focusing lens 130. Half-rate carriage unit 120 is driven in the same moving direction as full-rate carriage unit 110 at half its velocity, namely v/2, by a driving unit (not shown).

Focusing lens 130 has an f□ lens, and is disposed on a line between mirror 122 and inline sensor 140, focuses light from object O on inline sensor 140. Focusing lens 130 may be constructed not only as a single lens but also in various forms.

As described above, reflected light is guided by mirrors and a lens in the present embodiment. These mirrors and a lens will be referred collectively as a guiding unit. A guiding unit for guiding diffusely reflected light consists of mirror 113, rotatable reflector 116, half-rate carriage unit 120 and focusing lens 130. A guiding unit for guiding specularly reflected light consists of mirrors 114, 115, rotatable reflector 116, half-rate carriage unit 120 and focusing lens 130.

The light paths of specularly reflected light Lsr and diffusely reflected light Ldr from an object to the image-input unit are preferably same length. In this configuration no focus adjustment is required for each scanning operation, so that the operations are efficiently performed.

The numbers of reflections by mirrors of specularly reflected light Lsr and diffusely reflected light Ldr are preferably either odd numbers or even numbers. Otherwise, the image of specularly reflected light and the image of diffusely reflected light are formed upside down.

Inline sensor 140 outputs image signals according to intensity of the guided light. Inline sensor 140 is capable of simultaneously receiving light having different wavelengths. Inline sensor 140 is configured, for example, as a multiple-line CCD image sensor (multiple columns of image-input elements) equipped with on-chip color filters. For example, image-input elements having different spectral sensitivity are arranged in the CCD image sensor so that image-input elements in the same columns have the same spectral sensitivity and image-input elements in the adjacent columns have different spectral sensitivities.

In the present embodiment, inline sensor 140 is capable of generating 8 bit image signals for 4 colors of blue, blue green, green, and red (hereafter B, BG, G and R, respectively).

Platen glass 150 is a flat transparent glass plate, on which object O is placed. On both surfaces of platen glass 150, an antireflection layer such as multilayer dielectric film is formed, so that reflection from platen glass 150 is reduced. Platen cover 160 covers platen glass 150, so as to shut out external light. Accordingly, an optical image of object O is easily generated.

Inline sensor 140 receives light of either first light source 111 or second light source 112 reflected from object O placed on platen glass 150. Inline sensor 140 generates 4 image signals of 4 colors B, BG, G, R based on the received reflected light, and outputs them to image-processing unit 50. Image-processing unit 50 generates image data based on the image signals, and outputs it to image-forming unit 20.

In the present embodiment, image-reading unit 10 outputs three types of image signals according to types of incident light and reflected light: an image signal "45° color signal" for a diffusely reflected light of first light source 111 (45° incident, 0° reflection); an image signal "glossiness signal" for a specularly reflected light of first light source 111 (45° incident, 45° reflection); and an image signal "65° color signal" for a diffusely reflected light of second light source 112 (65° incident, 0° reflection). To generate these three types of image signals, image-reading unit 10 performs scanning operations three times.

A-4. Image-Forming Unit 20

As shown in FIG. 1, image-forming unit 20 has development units 210*a*, 210*b*, 210*c*, an intermediate transfer belt 220, primary transfer rollers 230*a*, 230*b*, 230*c*, a secondary transfer roller 240, a backup roller 250, a paper feed unit 260, a first fusing unit 270, a switching unit 280, and a second fusing unit 290. Development units 210*a*, 210*b*, 210*c* form toner images on the surface of intermediate transfer belt 220.

FIG. 5 illustrates a construction of development unit 210. It is to be noted that development units 210*a*, 210*b*, 210*c* have identical constructions but contain different toners. Accordingly, they are collectively referred as development unit 210, where no distinction needs to be made.

Development unit 210 in the present embodiment is a rotary type, and has a photoconductive drum 211, a charging unit 212, an exposure unit 213, and four development units 214, 215, 216, 217. Photoconductive drum 211 has a photoconductive layer on its surface, and works as an electric image holding body. The photoconductive layer consists of, for example, organic photo conducting material, and works as an acceptor of electric charges.

As shown in FIG. 1, photoconductive drum 211 rotates in the direction of arrow A. Charging unit 212 has a power source and a charging roller, and charges the surface of photoconductive drum 211 evenly.

Exposure unit 213 forms an electrostatic latent image having a prescribed electric potential on photoconductive drum 211, by lighting photoconductive drum 211 with a laser diode, for example. Development units 214, 215, 216, 217 store different colored toners, and form a toner image by transferring toner to the electrostatic latent image formed on the surface of photoconductive drum 211.

As shown in FIG. 5, each of development units 210*a*, 210*b*, 210*c* have 4 development units, respectively. Thus, image-forming unit 20 may form a toner image of up to 12 colors.

In the present embodiment, toner is selected from special color toners of red, orange, green, blue, gold, and silver, clear toner and formed toner as well as color toners of basic four colors of cyan, magenta, yellow, and black. The basic four colors are commonly used in an electro-photographic type image-forming device. Clear toner contains no colored material, and is prepared, for example, by coating of a surface of low molecular weight polyester resin with $SiO_2$ or $TiO_2$. Foam toner is prepared, for example, by addition of foaming agent such as bicarbonate or azo compound to polyester resin. When the resin is foamed with a help of foaming agents, a toner image becomes three-dimensional and shows unevenness.

Intermediate transfer belt 220 is configured as an endless belt member as shown in FIG. 1, and is driven in the direction of arrow B by a driving unit (not shown in FIG. 1). As shown in FIG. 1 and FIG. 5, the toner images formed on photoconductive drums 211 are primarily transferred to intermediate transfer belt 220 at the position of facing photoconductive drums 211. Intermediate transfer belt 220 conveys the transferred toner image to a position of facing recording paper P, where the toner images on intermediate transfer belt 220 are secondarily transferred, to recording paper P. Primary transfer rollers 230*a*, 230*b*, 230*c* press intermediate transfer belt 220 with appropriate pressure against photoconductive drums 211*a*, 211*b*, 211*c*, respectively at the position of each facing photoconductive drum, so that the toner image is transferred to intermediate transfer belt 220. Secondary transfer roller 240 and backup roller 250 presses intermediate transfer belt 220 against recording paper P with appropriate pressure, so as to transfer a toner image to recording paper P. Paper feed unit 260 has paper trays 261*a* and 261*b* for stocking various type of recording paper P, and provides recording paper P for forming an image. First fusing unit 270 has a roller member for heating and pressing recording paper P, and fuses the toner image transferred on the surface of recording paper P with heat and pressure.

Switching unit 280 changes the path of conveying recording paper P in the direction R in FIG. 1, when clear toner has been formed on the surface of recording paper P. Otherwise, switching unit 280 changes the path of conveying recording paper P in the direction L in FIG. 1 to eject recording paper P.

Second fusing unit 290 has a fusing belt 291, a heating unit 292 and a cooling unit 293. Second fusing unit 290 heats recording paper P with heating unit 292 and causes toner on recording paper P to melt, and cools the melted toner on recording paper P with cooling unit 293 while pressing recording paper P against flat surface of fusing belt 291, so as to make the surface of the toner image smooth, flat and highly glossy. The operation of forming highly glossy surface with second fusing unit 290 will be referred as "highly glossy operations".

Thus, image-forming unit 20 forms a toner image on recording paper P using 12 colored toners based on the image data input from image-processing unit 50. Details of forming a toner image will be described below.

B. Functions

FIG. 6 illustrates a functional diagram of image-forming device 1. Image-forming device 1 has an image-reading unit 10, an image-forming unit 20, a control unit 30, a storage unit 40, an image-processing unit 50, a user interface unit 60, and a data input/output unit 70.

Control unit 30 works as an operating unit, has a CPU (Central Processing Unit), a RAM (Random Access Memory), a ROM (Read Only Memory), and executes various computer programs stored in storage unit 40 to control units of image-forming device 1.

Storage unit 40 is configured as a mass storage unit, such as a hard disk drive, and stores a table DAT for storing spectral reflectivities of various objects and a look-up table LUT for storing a glossiness level of various objects, as well as various computer programs.

The table DAT stores for various objects their spectral reflectivities. Spectral reflectivity of an object may be measured using an equivalent color filter used in inline sensor 140.

FIG. 7 illustrates examples of data stored in LUT.

LUT stores, for each object, a name of the object indicating material of the object and intensities of reflected light: (45/0), (65/0), and (45/45).

Here, (45/0) denotes a light diffusely reflected at a reflection angle of 0° of an incident light, at an incident angle of 45° from first light source 111. (65/0) denotes light diffusely reflected at a reflection angle of 0° of an incident light, at an incident angle of 65° from second light source 112. (45/45) denotes a light specularly reflected at a reflection angle of 45° of an incident light, at an incident angle of 45° from first light source 111.

These intensity data are experimentally determined and stored in LUT.

LUT also stores, for each object, a glossiness level of the object, which ranges from level 1 to level 10. The glossiness level of an object corresponds to an intensity distribution of light reflected from the object. In the present embodiment, glossiness 10 means most glossy.

The glossiness level is predetermined based on the measured intensity distribution, and stored in LUT.

The glossiness level is generally determined to be high, when contributions of specular reflection in the reflected light are large.

In a basic form, glossiness level is determined to be high when the difference between the intensity of specularly reflected light and the intensity of diffusely reflected light is large.

As shown in FIG. 6, image-processing unit 50 has multiple image-processing circuits such as ASICs (Application Specific Integrated Circuits) or LSI (Large Scale Integration circuit) and image memory for storing image data temporally. Image-processing circuits perform prescribed processings, such as AD conversions, shading corrections, Gamma conversions, color-space conversions, rotations of images, enlargement/reduction of images, removing of background colors, screening, obtaining glossiness information or texture information, and estimation of spectral reflectivity.

Image-processing unit 50 generates image data by performing the above operations on the output image signal from image-reading unit 10. Image-processing unit 50 outputs the generated image data to image-forming unit 20.

User interface unit 60 has a touch panel type display and various buttons, and accepts instructions from an operator of image-forming device 1. Control unit 30 receives the instructions.

Data input/output unit 70 works as an interface unit for exchanging data with an external device. Image-forming device 1 is able to output image data to an external device such as a computer or a printer instead, when necessary.

C. Operations

In image-forming device 1, image-reading unit 10 reads an object and generates image signals. From the image signals, image-processing unit 50 generates image data. Image-forming unit 20 forms an image on recording paper by forming a toner image based on the image data, transferring the toner image to the recording paper, and fusing the toner image thereon.

C-1. Generating Image Signals

As described above, image-reading unit 10 performs scanning operations three times, and generates "45° color signal", "glossiness signal", and "65° color signal" in each scanning operation. It is to be noted that "45° color signal" and "65° color signal" are generated based on diffusely reflected light, and are used for determining color information of an object, and that "glossiness signal" is based on specularly reflected light, and is used for determining glossiness information of an object.

The three-path scanning operations will be described with reference to FIG. 1 and FIG. 3. It is assumed here that 45° color signals, 65° color signals, and glossiness signals are generated in this order.

(45° Color Signal)

First, light source 111 lights object O, while second light source 112 is shut off. Rotatable reflector 116 is positioned at the position shown by lines in FIG. 3, where the propagation of specularly reflected light Lsr is blocked by rotatable reflector 116, whereas diffusely reflected light Ldr is guided to inline sensor 140. During the time that full-rate carriage unit 110 is moved from start point to end point in the direction of arrow C shown in FIG. 1, the whole surface of object O is scanned by first light source 111, and inline sensor 140 receives diffusely reflected light from the whole surface of object O. Then, inline sensor 140 outputs 45° color signal to image-processing unit 50, where 45° color signals are stored in image memory temporally.

(65° Color Signal)

First light source 111 is turned off while second light source 112 lights object O. Rotatable reflector 116 is positioned at the position shown by lines in FIG. 3, and blocks the propagation of specularly reflected light Lsr. After similar operations, 65° color signals are stored temporarily in image memory.

(Glossiness Signal)

Rotatable reflector 116 is turned around and is positioned at the position 116' in FIG. 3, so that diffusely reflected light Ldr is adsorbed by light trap 116*t*.

Then, first light source 111 lights object O while second light source 112 is turned off.

Accordingly, light specularly reflected from object O is guided to inline sensor 140 in this configuration.

After similar operations, glossiness signals are stored temporarily in image memory.

Accordingly, 3 types of image signal are generated. It should be noted that these image signals are generated for each of 4 colors of blue, blue green, green, red. Namely, image-processing unit 10 generates a total of 12 types of image signals, and provides these signals to image-processing unit 50.

Image-processing unit 50 determines a glossiness level and a texture of each image element and generates glossiness information and texture information when generating image data based on the input image signals. Image-processing unit 50 also estimates spectral reflectivity of object O from the input image signals, and generates image data reflecting the estimated spectral reflectivity.

It is assumed that basic/fundamental image-processings such as AD conversion, shading correction, Gamma conversion are already applied to image signal.

C-2. Generating Glossiness Information

Figure 8:
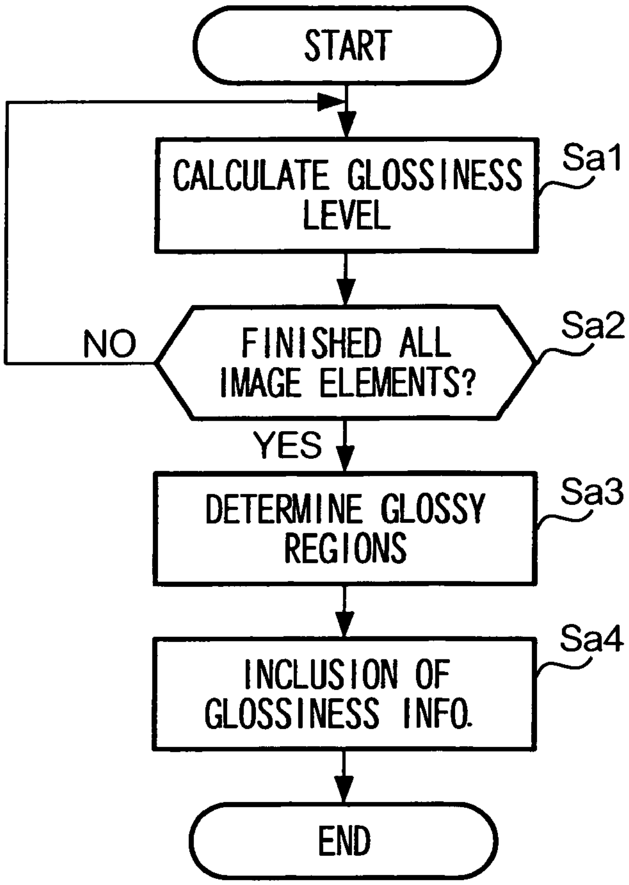
FIG. 8 is a flowchart illustrating operations, of an image-forming device according to the same embodiment, generating glossiness information.

FIG. 8 is a flowchart illustrating operations, of image-processing unit 50, generating glossiness information.

Image-processing unit 50 determines a glossiness level of each image element by comparing data stored in LUT and a 45° color signal, a 65° color signal and a glossiness signal (Step Sa1). More specifically, image-processing unit 50 determines intensities of reflected light for each image element from the bit values of a 45° color signal, a 65° color signal and a glossiness signal, and compares these intensities of reflected light with the data of LUT stored in storage unit 40. Image-processing unit 50 determines the data of LUT nearest to these intensities, and sets a glossiness level of the image element to the glossiness level corresponding to the determined data in LUT.

In an example of FIG. 7, when intensities of reflected light obtained from a 45° color signal, a 65° color signal, and a glossiness signal for an image element are "3", "3", "90", image-processing unit 50 determines the first record (Metal A) in LUT is nearest to this intensity distribution, and determines the glossiness level of the image element to be "10".

Image-processing unit 50 performs the operations for all image elements. Namely, image-processing unit 50 determines whether the above operations have been performed for all image elements (Step Sa2). If the operations have not yet been performed for any image elements (Step Sa2;NO), image-processing unit 50 performs the operations for the image elements (Step Sa1).

If the operations have been performed for all image elements (Step Sa2;YES), image-processing unit 50 determines image regions of image elements, whose glossiness level is higher than a threshold (for example, level "8"). These image regions will be referred to as "glossy regions".

When glossy regions are determined, image-processing unit 50 generates glossiness information based on the determined glossy regions and includes the glossiness information in the image data (Step Sa4).

Glossiness information expresses where the glossy regions exist in the image data and is, for example, included in the image data as overlay information.

Figure 9:
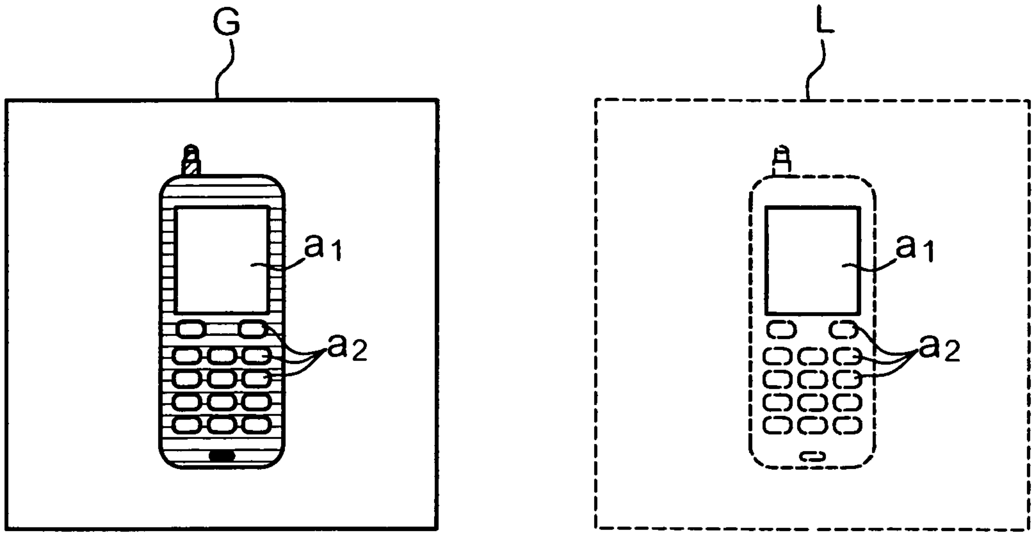
FIG. 9 illustrates an example of glossiness information.

FIG. 9 illustrates an example of image data G and glossiness information L expressed as overlay information for a mobile phone. When the surfaces of display region a1 and button regions a2 of mobile phone are glossy, region a1 and regions a2 are defined with solid lines in glossiness information L expressed as overlay information.

Accordingly, glossiness information is included in the image data.

C-3. Generating Texture Information

Texture information expresses macroscopic nature of a surface of an object, such as texture; namely, how coarse or uneven the surface of an object is.

"Coarse appearance" and "unevenness" become visible due to the differences in the macroscopic nature of a surface, much larger than wavelength of light.

The inventors have found that a "shadow" on the surface of an object is usable to determine a texture of the surface of the object such as "coarse appearance" and "unevenness".

When unevenness is visible, namely, of a macroscopic scale, the unevenness causes shadows on the surface of an object, whereas microscopic unevenness does not cause visible shadows.

The height (vertical distance from the macroscopic surface plane) of unevenness may be determined from the lengths of shadows causes by the unevenness of the surface, when light is impinged on an object from a prescribed direction.

Figure 10:
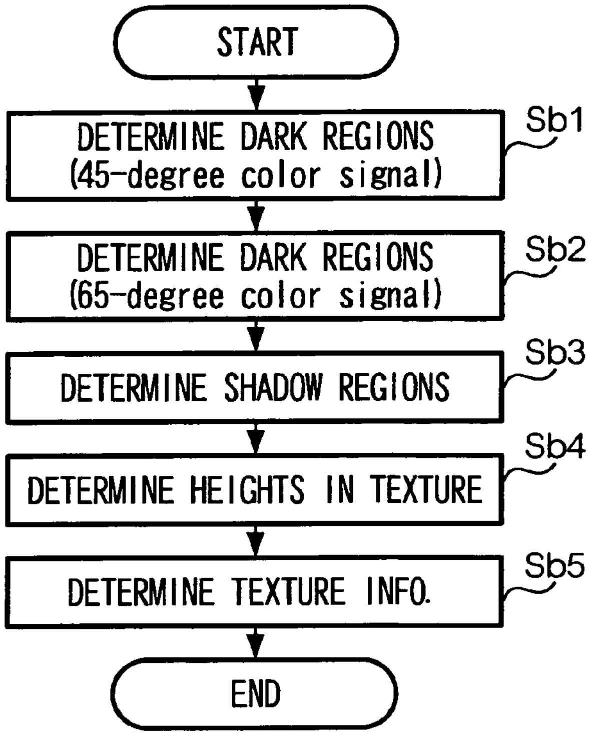
FIG. 10 is a flowchart illustrating operations, of an image-forming device according to the same embodiment, generating texture information.

FIG. 10 is a flowchart illustrating operations, of image-processing unit 50, generating texture information.

Image-processing unit 50 determines dark regions from 45° color signals (Step Sb1). A dark region means a region where brightness or saturation of color is below a prescribed threshold.

Image-processing unit 50 determines dark regions from 65° color signals (Step Sb2).

Image-processing unit 50 determines regions corresponding to shadows (Step Sb3).

Since the dark region is determined based on the brightness and saturation of color, dark colored regions of object O may be also determined as dark regions. These regions should be distinguished from the regions corresponding to shadows.

In the present embodiment, image-processing unit 50 compares the dark regions determined from 45° color signal and the dark regions determined from 65° color signal. Image-processing unit 50 determines a dark region is not a shadow, when the shape of the dark region has an identical shape in both cases. Image-processing unit 50 determines a dark region is a shadow when the shapes of the dark region differ. This region will be referred to as "shadow region".

With reference to FIGS. 11A to 11C, an example of obtaining texture information is explained.

FIG. 11A illustrates a cross-sectional view of a convex region Cv (h: height of convex region Cv) formed on the surface of object O, light L45 for lighting object O from first light source 111 with incident angle of 45°, and light L65 lighting object O from second light source 112 at an incident angle of 65°. FIGS. 11B and 11C illustrate 45° color signals and 65° color signals, respectively. Dark regions S are formed in these color signals, where no light is incident due to convex region Cv.

As shown in FIGS. 11B and 11C, these dark regions caused by the same convex region Cv are different between 45° color signals and in 65° color signals.

When the difference in lengths of shadows exceeds a prescribed threshold, image-processing unit 50 determines the dark region S to be a shadow region. Image-processing unit 50 then stores a length of shadow L45 in 45° color signals or a length of shadow L65 in 65° color signals.

Figure 11:
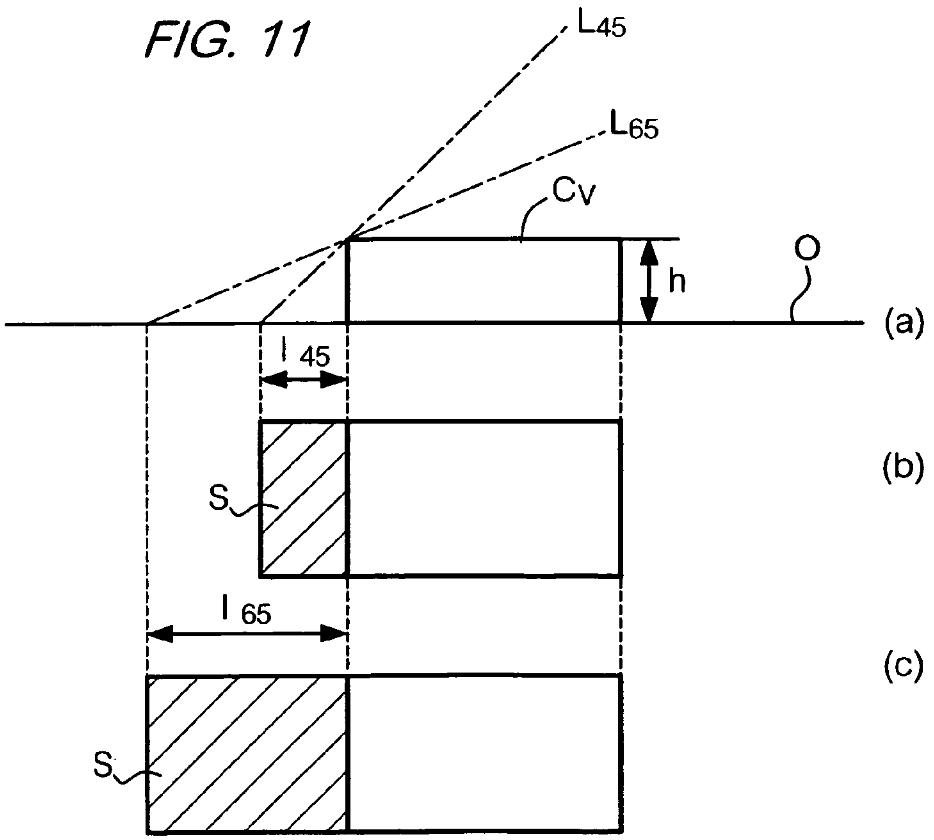
FIGS. 11A to 11C illustrate how a region is determined as a shadow region in the image-forming device according to the same embodiment.

As shown in FIG. 10, image-processing unit 50 then calculates heights in the textures based on the stored lengths of shadows (Step Sb4). In the example of FIG. 11, the height of convex region Cv is calculated by multiplying a tangent of the incident angle and the length of shadow, yielding "L45×tan 45°" or "L65×tan 65°".

Image-processing unit 50 generates texture information based on the calculated heights in texture (Step Sb5).

Texture information expresses regions where the calculated height excesses a prescribed threshold. In the example of FIG. 11, texture information expresses convex region Cv causing shadow region S.

It is to be noted that texture information may include regions of multi-level heights in texture.

Thus, texture information is obtained. Texture information is then included in image data. Texture information may be included in image data as overlay information C-4. Estimation of Spectral Reflectivity Image-processing unit 50 estimates spectral reflectivity of object O by comparing 45° color signals and spectral reflectivities stored in table DAT in storage unit 40 with various techniques. These techniques include a low-dimensional linear approximation method based on a principal component analysis, Wiener estimation method, or estimation method using neural networks or multiple regression analysis.

Image-processing unit 50 generates image data based on the estimated spectral reflectivity.

As described above, image-forming device 1 according to the present embodiment may use 10 colored toners of cyan, magenta, yellow, black, red, orange, green, blue, gold, silver and a clear toner and a foam toner. Thus, image-forming device 1 may produce a wider range of color than the conventional image-forming device using basic 4 colors of cyan, magenta, yellow, and black. Image-forming device 1 may produce an equivalent color image with various combinations of toners.

Image-processing unit 50 selects best combinations of toners based on the estimation of spectral reflectivity of an object. Namely, image-processing unit 50 selects the most similar combinations of toners to the spectral reflectivity of an object.

Image-processing unit 50 determines best combinations of operations and best parameters for operations such as color correction, color conversion, under-color removal, halftone dot shape generation, based on the estimation of spectral reflectivity of an object. For example, image-processing unit 50 may change half tone dot shapes for toners or increase the use of black toner based on spectral reflectivity.

Thus, image-processing unit 50 generates image data from image signals generated by image-reading unit 10.

C-5. Forming Image

In the present embodiment, image-forming unit 20 has multiple rotary type development units arranged in series (tandem) facing intermediate transfer belt 220. Thus, though relatively small, image-forming unit 20 is able to form images using multi-color toners speedily. Image-forming unit 20 also has clear toner for expressing glossiness; and foam toner for expressing texture.

It is noted that, except when using a clear toner or a foam toner, the operations of image-forming unit 20 according to the present embodiment are similar to those of the conventional image-forming unit. Accordingly, only operations using a clear toner or a foam toner will be described in detail.

Figure 12:
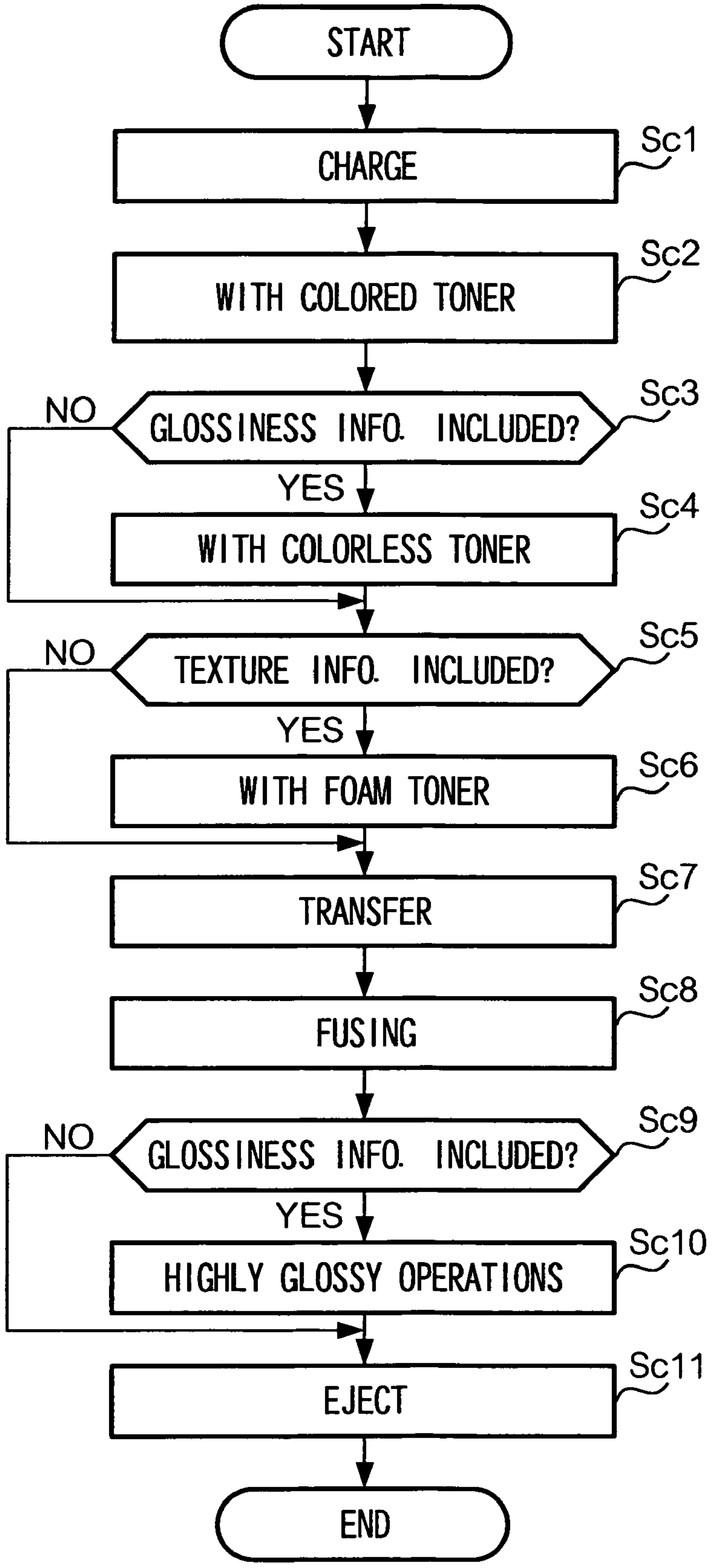
FIG. 12 is a flowchart illustrating operations, of an image-forming device according to the same embodiment, forming an image.

FIG. 12 is a flowchart illustrating operations of image-forming unit 20 generating an image.

Image-forming unit 20 charges, in response to image data input, photoconductive drum 211 evenly at a prescribed voltage (Step Sc1). Image-forming unit 20 forms a toner image with each colored toner (exclusively a clear toner and a foam toner) in successive order (Step Sc2). The formation of a toner image of each colored toner is performed in the above-described manner.

Image-forming unit 20 determines whether glossiness information is included in the input image data as overlay information (Step Sc3).

If glossiness information is included (Step Sc3;YES), image-forming unit 20 forms a toner image with a clear toner based on the overlay information (Step Sc4). If the overlay information includes regions of multi-level glossy regions, image-forming unit 20 controls exposure based on the level to control the concentration of toner. If glossiness information is not included (Step Sc3;NO), image-forming unit 20 skips the operations of forming a toner image with clear toner.

Image-forming unit 20 determines whether texture information is included in the input image data as overlay information (Step Sc5).

If the overlay information is included (Step Sc5;YES), image-forming unit 20 forms a toner image using a foam toner based on the overlay information (Step Sc6). If the overlay information includes regions of multi-level height in texture, image-forming unit 20 controls exposure based on the level to control the concentration of toner. If texture information is not included (Step Sc5;NO), image-forming unit 20 skips the operations of forming a toner image using a foam toner.

It is to be noted that clear toner is preferably formed on recording paper over other toners, so as to provide a glossy surface of an image.

Then, image-forming unit 20 conveys a toner image on intermediate transfer belt 220, and transfers the toner image to recording paper at the position of secondary transfer roller 240 (Step Sc7). Image-forming unit 20 conveys recording paper to first fusing unit 270, where the toner image transferred on the recording paper is fused (Step Sc8).

Image-forming unit 20 determines whether glossiness information is included in the input image data (Step Sc9).

This step may be replaced, for example, by storing the result of the determination at Step Sc3 and referring to the result, or by determining whether a toner image is formed using a clear toner.

If glossiness information is included in the image data (Step Sc9;YES), image-forming unit 20 performs highly glossy operations (Step Sc10). Image-forming unit 20 ejects the recording paper on which highly glossy operations are performed (Step Sc11), so as to end the operations.

If glossiness information is not included in the image data (Step Sc9;NO), image-forming unit 20 ejects the recording paper (Step Sc11), so as to end the operations.

Accordingly, image-forming device 1 reproduces an appearance of an object such as glossiness or texture on images. Image-forming device 1 also estimates spectral reflectivity of an object, and determines best combinations of multi-colored toners and operations for reproducing the spectral reflection, performs the determined operations using the determined combinations of toners, so that metamerism due to differences in visible light sources (lightings) is suppressed, and high-fidelity color of an object is reproduced for any incident light source.

D. Modifications

The foregoing description of the embodiment of the present invention has been provided for the purpose of illustration. It is not intended to be exhaustive or to limit the invention to the precise forms disclosed. Obviously, many modifications and variations will be apparent to practitioners skilled in the art.

(1) In the full-rate carriage unit, the incident angle of the second light source may be set to other than 65°. The incident angle of the second light source may be chosen from angles at which texture of an object is easily recognizable. If this applies, the incident angle of the second light source may be even smaller than the incident angle of the first light source.

(2) The first light source 111 and the second light source 112 may be constructed from multiple light sources, each having different spectral energy distribution. Using this type of light source, metamerism can be further suppressed.

(3) Guiding units such as mirrors may be constructed in various forms.

Figure 13:
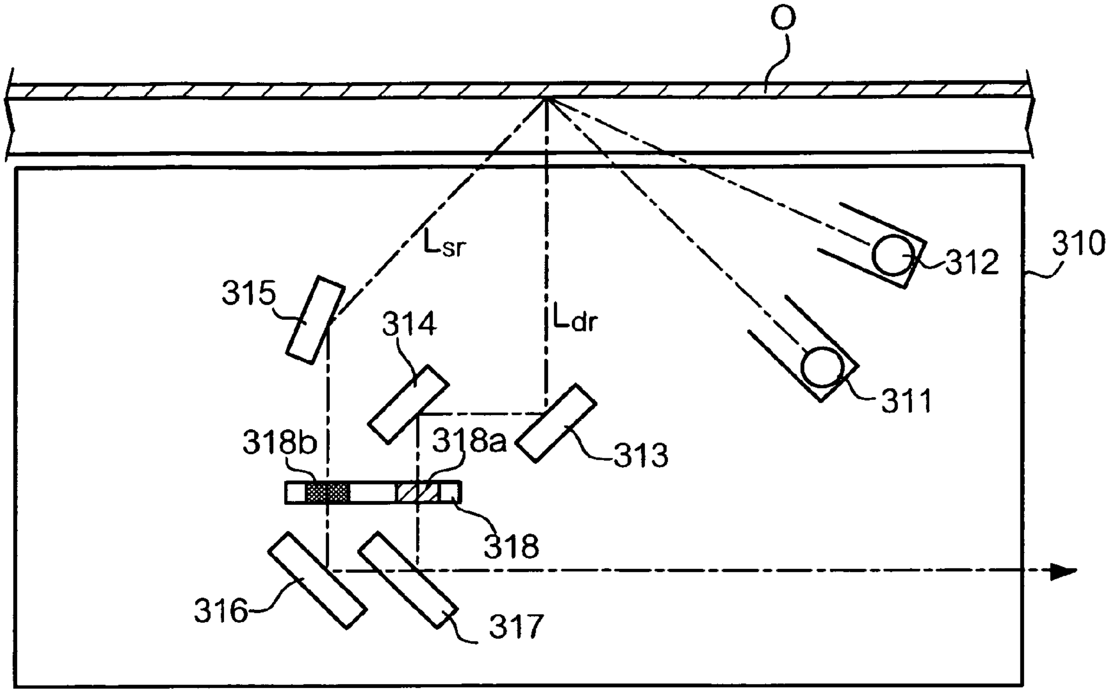
FIG. 13 illustrates a modification of a full-rate carriage unit.

FIG. 13 illustrates an example where full-rate carriage unit 310 has a liquid crystal shutter. Full-rate carriage unit 310 has a first light source 311, a second light source 312, mirrors 313, 314, 315, 316, a half mirror 317, and a liquid crystal shutter 318.

Liquid crystal shutter 318 is a device able to change the transmission of light propagating in the device, when an electric voltage is applied to the device. In the example of FIG. 13, light transmission of region 318*a*, where diffusely reflected light Ldr is propagating, and light transmission of region 318*b*, where specularly reflected light Lsr is propagating, may be independently changed.

Half mirror 317 reflects diffusely reflected light Ldr from mirror 314, while specularly reflected light Lsr from mirror 316 is transmitted through half mirror 317.

When using full-rate carriage unit 310 to receive diffusely reflected light Ldr, the light transmission of region 318*a* is increased to nearly 100%, whereas light transmission of region 318*b* is reduced to nearly 0%.

When using full-rate carriage unit 310 to receive specularly reflected light Lsr, the light transmission of region 318*a* is reduced to nearly 0%, whereas the light transmission of region 318*b* is increased to nearly 100%.

With this construction, full-rate carriage unit 310 may receive both specularly reflected light Lsr and diffusely reflected light Ldr.

Figure 14:
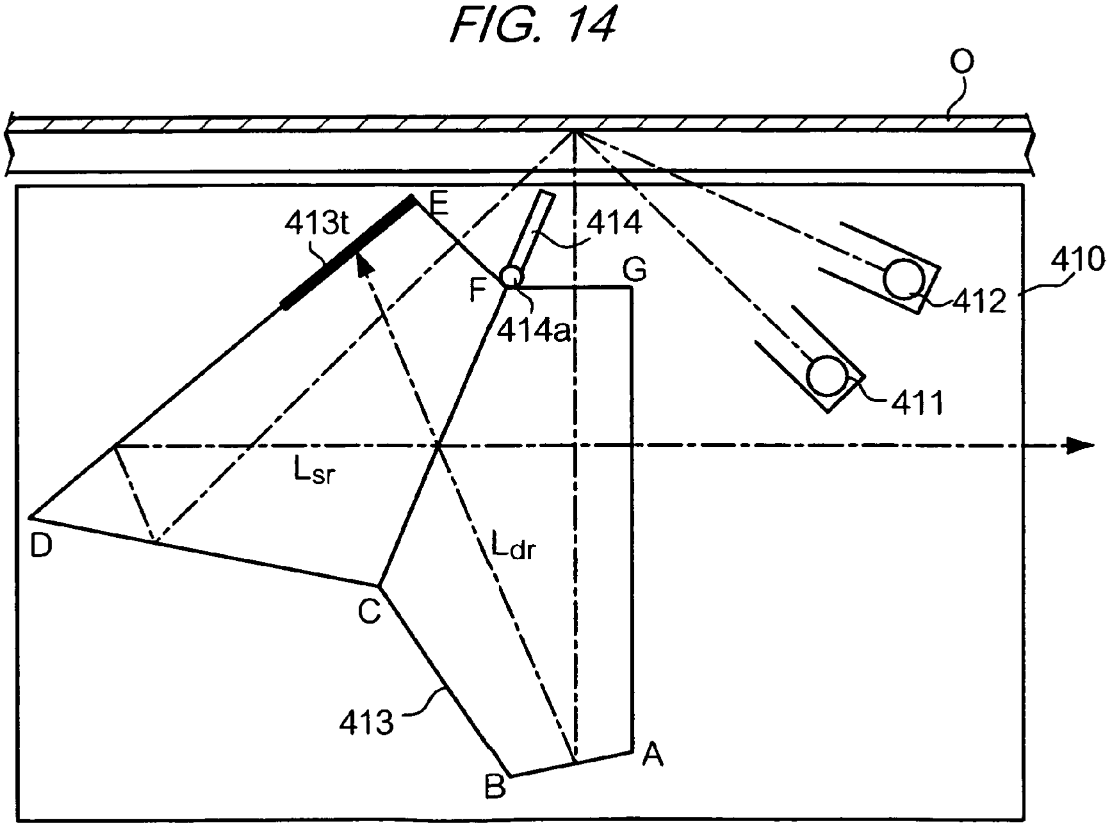
FIG. 14 illustrates a modification of a full-rate carriage unit.

(4) FIG. 14 illustrates an example where full-rate carriage unit 410 has a prism mirror. Full-rate carriage unit 410 has a first light source 411, a second light source 412, a prism mirror 413, and a rotatable light trap 414.

Prism mirror 413 is multiangular cylinder and is prepared by coating a mirror layer, a half mirror layer, or an antireflection layer on a face of a multiangular cylinder of low refraction index and low dispersion glass material, such as SCHOTT AG's BK7™ glass, and gluing these multiple multiangular cylinders with an optical adhesive having substantially the same order of refraction index as the glass material. The cross section of prism mirror 413 forms a heptagon having vertexes A, B, C, D, E, F, and G.

On faces AB, CD, DE, aluminum thin layers are vacuum deposited, and these faces function as mirrors. On face CF, a half mirror is formed. On the portions of face DE corresponding to 413*t* in FIG. 13, an antireflection layer similar to light trap 116*t* is formed.

Rotatable light trap 414 is rotatable around axis 414*a* by a driving unit (not shown). On both sides of rotatable light trap 414, antireflection layers similar to light trap 116*t* are provided. When positioned in parallel to face EF of prism mirror 413, rotatable light trap 414 adsorbs diffusely reflected light Ldr from object O. When positioned in parallel to face DE of prism mirror 413, rotatable light trap 414 adsorbs specularly reflected light Lsr from object O.

With this construction, full-rate carriage unit 410 may receive both specularly reflected light Lsr and diffusely reflected light Ldr.

Furthermore, various modifications may be applied such as increasing a number of reflections.

(5) Variations of angles of reflected light may be added. For example, in addition to the above explained −5° to +5° and 40° to 50°, light reflected with reflection angles of 55° to 75°, of 17.5° to 27.5° may be received. In this case LUT may store more intensity data for the newly added reflection angles. A most appropriate reflection angle may be selected according to materials or glossiness level of an object or an operator's choice.

(6) Image-input unit may be constructed as 1-line image sensor with a slide or rotary type color filter. This construction allows the inline sensor to be manufactured at lower cost. However, this construction has a drawback that the number of paths of scanning becomes larger as the number of colors to be input increases.

(7) Inline sensor may receive more than 4 colors. The estimation of spectral reflectivity of an object may be more precise as the number of colors increases. However, by taking account of data sizes and processing times required for a more precise estimation, 4 to 6 colors may be appropriated for the estimation. Various colors with various wavelengths may be used for the present embodiment. FIG. 15 illustrates preferred colors for estimating a spectral reflectivity.

(8) Image-forming unit may be constructed in various forms. For example, a tandem of 12 development units of each color may be disposed in the image-forming unit. As another example, an image-forming unit has a development unit for clear toner, a development unit for a foam toner, and a rotary type development unit for all the colored toners.

(9) An image-forming unit may have a paper conveyor belt instead of an intermediate transfer belt, and image toner may be directly transferred from a photoconductive drum to a recording paper without transferring to an intermediate transfer member (intermediate transfer belt).

(10) Texture of a region may be expressed with control of brightness and saturation of color or shading in the region.

(11) When using a clear toner, a different recording paper, such as a coated paper may be used. Coated paper is prepared by formation of a receipt layer of thermoplastic resin such as polyethylene on the surface of material, such as cellulose, commonly used for recording paper. When heated and pressed the toner formed on the surface of coated paper is embedded in the receipt layer. The receipt layer may include paraffin wax for improving the transfer of toner. Using such a recording paper, the surface of an image may have a glossier finish.

(12) Image-forming device may have several prescribed operational modes to be selected by an operator, such as "metal mode" or "fabric mode". If "metal mode" is selected, only data confined to objects of metal in LUT are compared to calculate a glossiness level of an object.

(13) The present invention may be applied for an image input device, such as a scanner, having similar components of the image-input unit of the embodiment of the present invention.

As described above, according to an aspect of the present invention, there is provided a device, which has a first lighting unit that lights an object at a first incident angle; a second lighting unit that lights the object at a second incident angle; an image-input unit that receives light and generating image signals for the received light according to the intensity of the received light; a first guiding unit that guides diffusely reflected light from the object to the image-input unit, allows the image-input unit to generate first image signals for the diffusely reflected light from the object lit by the first light source and allows the image-input unit to generate second image signals for the diffusely reflected light from the object lit by the second light source; a second guiding unit that guides specularly reflected light from the object to the image-input unit, allows the image-input unit to generate third image signals for the specularly reflected light; a unit that generates glossiness information expressing the glossy regions on the object based on the first and the third image signals generated by the image-input unit; a unit that generates texture information expressing the textured region on the object based on the first and the second image signals generated by the image-input unit; and a unit that generates image data based on at least one of the first signals or the second signals, and includes the generated glossiness information and the generated texture information in the image data. The first and the second lighting unit may light the object with light whose spectral energy distribution covers the whole range of visible light, and the image-input unit may have at least 4 lines of multiple image input elements, and spectral sensitivities of image input elements may differ between the lines of multiple image input elements. The first and the second lighting units may light the object with light having different spectral energy distributions.

With the device, image data may be obtained for reproducing high-fidelity color of an object for any incident light source (suppressing metamerism).

The first guiding unit may guide the diffusely reflected light at a reflection angle of about −5° to about 5° to the image-input unit, and the second guiding unit may guide the specularly reflected light at a reflection angle of about 40° to about 50° to the image-input unit. The first guiding unit may also guide the diffusely reflected light at a reflection angle of about 55° to about 75° to the image-input unit. Furthermore, the first guiding unit may guide the diffusely reflected light at a reflection angle of about 17.5° to about 27.5° to the image-input unit.

According to an aspect of the present invention, there is provided a device, which has a first lighting unit that lights an object at a first incident angle; a second lighting unit that lights the object at a second incident angle; an image-input unit that receives light and generates image signals for the received light according to the intensity of the received light; a first guiding unit that guides diffusely reflected light from the object to the image-input unit, allows the image-input unit to generate first image signals for the diffusely reflected light from the object lit by the first light source and allows the image-input unit to generate second image signals for the diffusely reflected light from the object lit by the second light source; a second guiding unit that guides specularly reflected light from the object to the image-input unit, allows the image-input unit to generate third image signals for the specularly reflected light; a unit that generates glossiness information expressing the glossy regions on the object based on the first and the third image signals generated by the image-input unit; a unit that generates texture information expressing the textured region on the object based on the first and the second image signals generated by the image-input unit; a unit that generates image data based on at least one of the first signals or the second signals, and includes the generated glossiness information and the generated texture information in the image data; and a unit that forms a toner image on a recording medium based on the generated image data.

With the device, an appearance of an object such as glossiness or texture may be reproduced by forming a toner image on a recording medium.

According to an aspect of the invention the image-forming unit may form a toner image with at least 5 colored toners. With this construction, metamerism may be suppressed for the formed image.

The image-forming unit may form a toner image with clear toners on the region specified by the glossiness information in the image data. With this construction, glossy regions may be reproduced better.

The image-forming unit may form a toner image with foam toner on the region specified by the glossiness information in the image data. With this construction, texture (unevenness) of regions may be reproduced better.

According to an aspect of the present invention, there is provided a method for obtaining appearance information. The method includes steps of lighting an object at a first incident angle to generate a first image signal corresponding to specularly reflected light; lighting the object at the first incident angle to generate a third image signal corresponding to diffusely reflected light; lighting the object at a second incident angle to generate a second image signal corresponding to diffusely reflected light; generating glossiness information expressing glossy regions on the object by comparing the first image signal and the third image signal; generating texture information expressing textured regions on the object by comparing the first image signal and the second image signal; generating image data expressing the object based on the image signal corresponding to diffusely reflected light; and including the glossiness information and the texture information in the image data, and outputting the image data As explained above, according to an embodiment of the present invention, information on appearance may be easily obtained from an object and the appearance of the object may be easily reproduced.

What is claimed is:

1. A device comprising:

a first lighting unit that lights an object at a first incident angle;

a second lighting unit that lights the object at a second incident angle;

an image-input unit that receives light and generates image signals for the received light according to the intensity of the received light;

a first guiding unit that guides diffusely reflected light from the object to the image-input unit, allows the image-input unit to generate first image signals for the diffusely reflected light from the object lit by the first light source and allows the image-input unit to generate second image signals for the diffusely reflected light from the object lit by the second light source;

a second guiding unit that guides specularly reflected light from the object to the image-input unit, allows the image-input unit to generate third image signals for the specularly reflected light from the object;

a unit that generates glossiness information expressing the glossy regions on the object based on the first and the third image signals generated by the image-input unit;

a unit that generates texture information expressing the textured region on the object based on the first and the second image signals generated by the image-input unit; and a unit that generates image data based on at least one of the first signals or the second signals, and includes the generated glossiness information and the generated texture information in the image data.

2. The device according to claim 1, wherein the first and the second lighting unit light the object with light having spectral energy distribution that covers the whole range of visible light, and the image-input unit has at least 4 lines of multiple image input elements, and spectral sensitivities of image input elements differ between the lines of multiple image input elements.

3. The device according to claim 1, wherein the first and the second lighting units light the object with light having different spectral energy distributions.

4. The device according to claim 1, wherein the first guiding unit guides the diffusely reflected light at a reflection angle of about −5° to about 5° to the image-input unit, and the second guiding unit guides the specularly reflected light at a reflection angle of about 40° to about 50° to the image-input unit.

5. The device according to claim 4, wherein the first guiding unit also guides the diffusely reflected light at a reflection angle of about 55° to about 75° to the image-input unit.

6. The device according to claim 5, wherein the first guiding unit also guides the diffusely reflected light at a reflection angle of about 17.5° to about 27.5° to the image-input unit.

7. A device comprising:

a first lighting unit that lights an object at a first incident angle;

a second lighting unit that lights the object at a second incident angle;

an image-input unit that receives light and generating image signals for the received light according to the intensity of the received light;

a first guiding unit that guides diffusely reflected light from the object to the image-input unit, allows the image-input unit to generate first image signals for the diffusely reflected light from the object lit by the first light source and allows the image-input unit to generate second image signals for the diffusely reflected light from the object lit by the second light source;

a second guiding unit that guides specularly reflected light from the object to the image-input unit, allows the image-input unit to generate third image signals for the specularly reflected light;

a unit that generates glossiness information expressing the glossy regions on the object based on the first and the third image signals generated by the image-input unit;

a unit that generates texture information expressing the textured region on the object based on the first and the third image signals generated by the image-input unit;

a unit that generates image data based on at least one of the first signals or the second signals, and includes the generated glossiness information and the generated texture information in the image data; and a unit that forms a toner image on a recording medium based on the generated image data.

8. The device according to claim 7, wherein the image-forming unit forms a toner image with at least 5 colored toners.

9. The device according to claim 7, wherein the image-forming unit forms a toner image with clear toners on the region specified by the glossiness information in the image data.

10. The device according to claim 7, wherein the image-forming unit forms a toner image with foam toner on the region specified by the glossiness information in the image data.

11. A method for obtaining appearance information, comprising:

lighting an object at a first incident angle to generate a first image signal corresponding to specularly reflected light;

lighting the object at the first incident angle to generate a third image signal corresponding to diffusely reflected light;

lighting the object at a second incident angle to generate a second image signal corresponding to diffusely reflected light;

generating glossiness information expressing glossy regions on the object by comparing the first image signal and the third image signal;

generating texture information expressing textured regions on the object by comparing the first image signal and the second image signal;

generating image data expressing the object based on the image signal corresponding to diffusely reflected light; and including the glossiness information and the texture information in the image data, and outputting the image data.

* * * * *